United States Patent [19]

Bridwell et al.

[11] 4,030,623

[45] June 21, 1977

[54] HYDRAULIC CIRCUITRY FOR AN EXCAVATOR

[75] Inventors: John W. Bridwell, Peoria; Donald L. Hopkins; Kenneth R. Lohbauer, both of Joliet, all of Ill.

[73] Assignee: Caterpillar Tractor Co., Peoria, Ill.

[22] Filed: Apr. 29, 1976

[21] Appl. No.: 681,366

Related U.S. Application Data

[63] Continuation of Ser. No. 207,027, Dec. 13, 1971, abandoned.

[52] U.S. Cl. .............................. 214/138 R; 60/421
[51] Int. Cl.² ......................................... E02F 3/32
[58] Field of Search ......... 214/762, 138, 763, 764, 214/133; 60/52 HE, 97 P, 421; 180/6.48; 91/6

[56] References Cited

UNITED STATES PATENTS

| 3,641,876 | 2/1972 | Wienke ........................... 60/52 HE |
| 3,646,596 | 2/1972 | Bauer .............................. 60/52 HE |
| 3,720,059 | 3/1973 | Schurawski et al. ................. 60/421 |

*Primary Examiner*—L. J. Paperner
*Assistant Examiner*—Ross Weaver
*Attorney, Agent, or Firm*—Phillips, Moore, Weissenberger, Lempio & Majestic

[57] ABSTRACT

A hydraulic circuit is provided for powering and controlling an excavator or the like, with a plurality of pumps supplying pressurized fluid for the circuit. The circuit is arranged so that fluid is provided in a manner to permit positive independent control of the various implement motors of the machine, with means provided so that fluid may also be combined to operate selected implement motors for faster operation and maximum efficiency of the machine.

17 Claims, 7 Drawing Figures

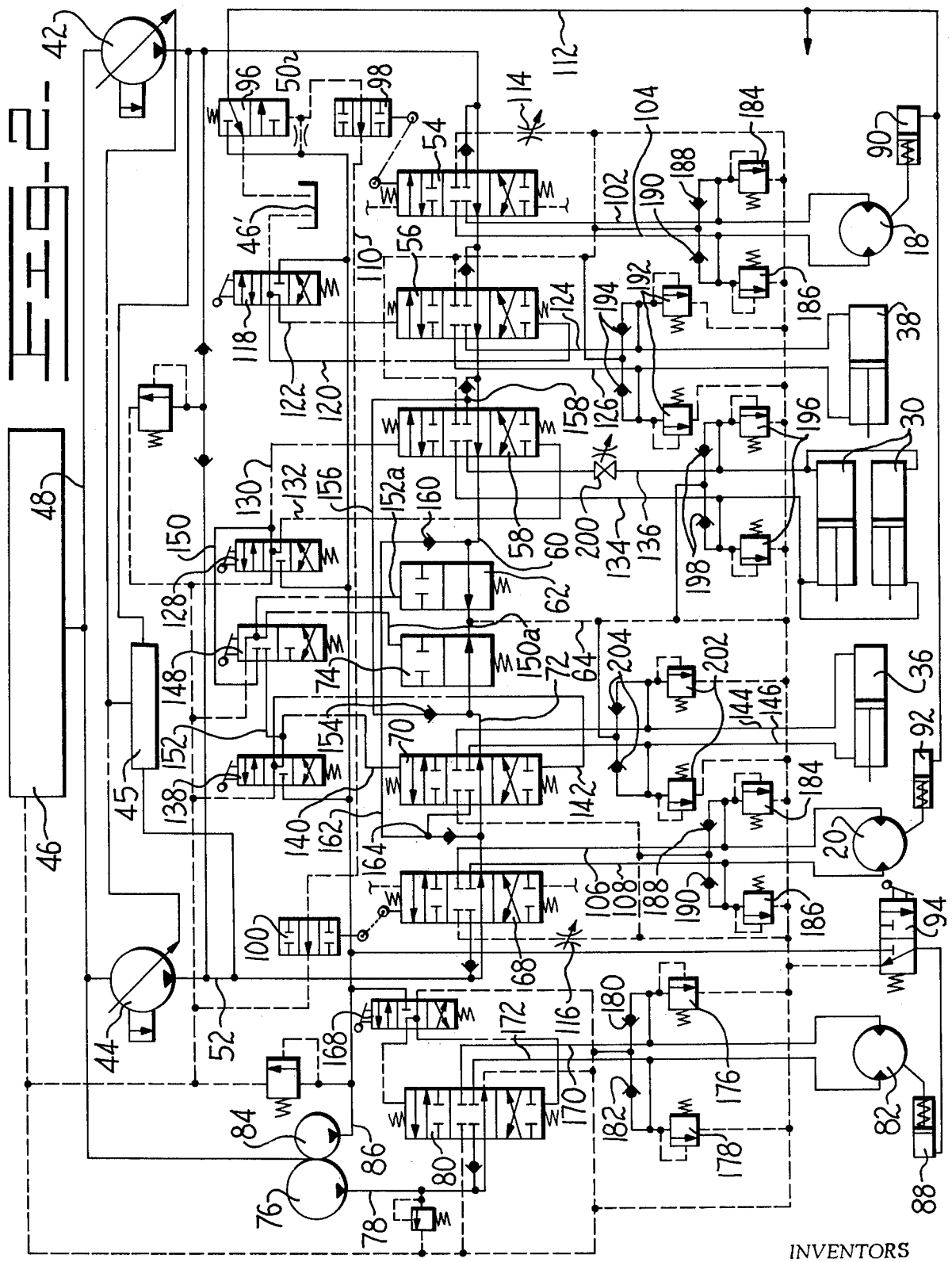

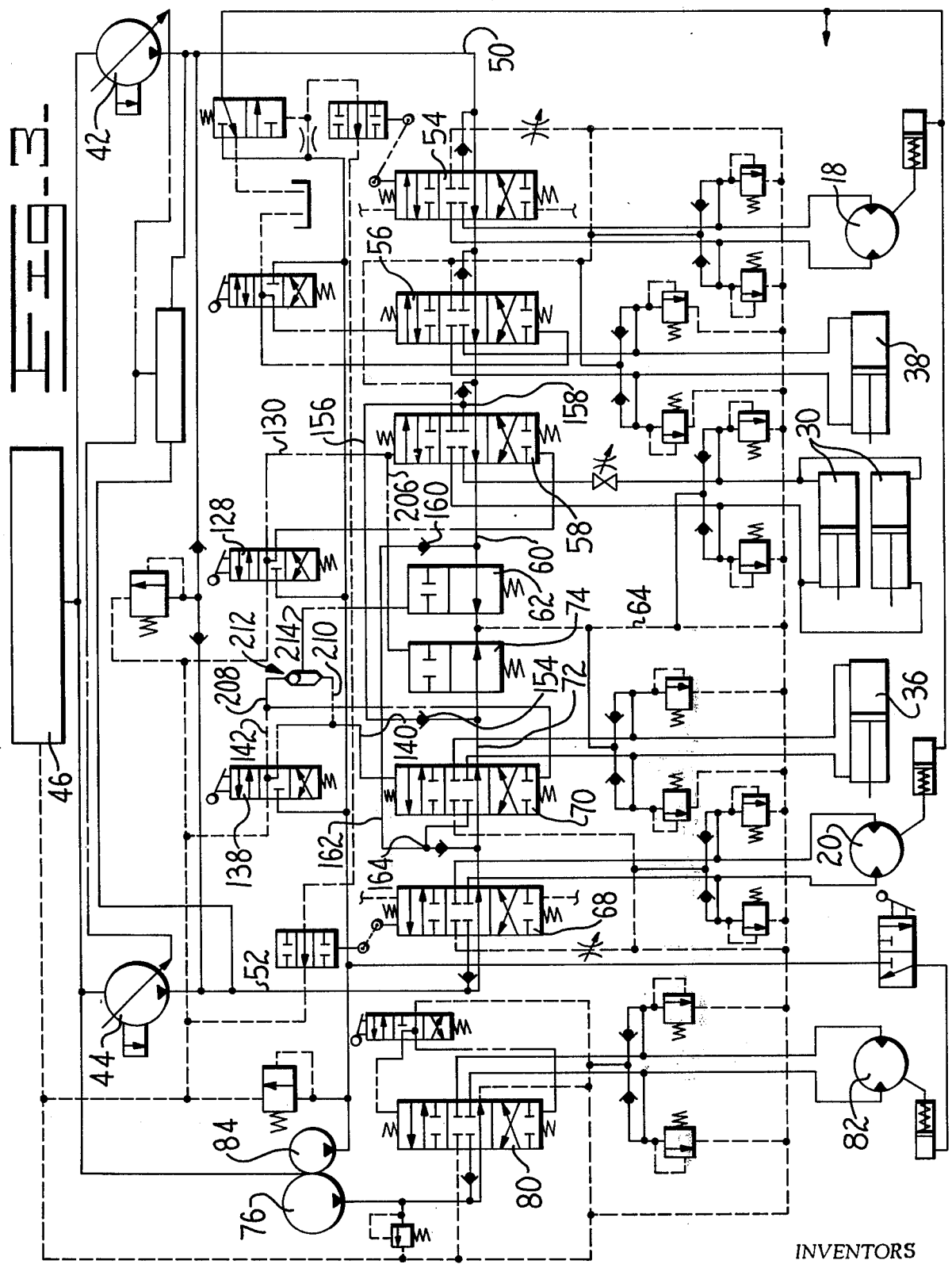

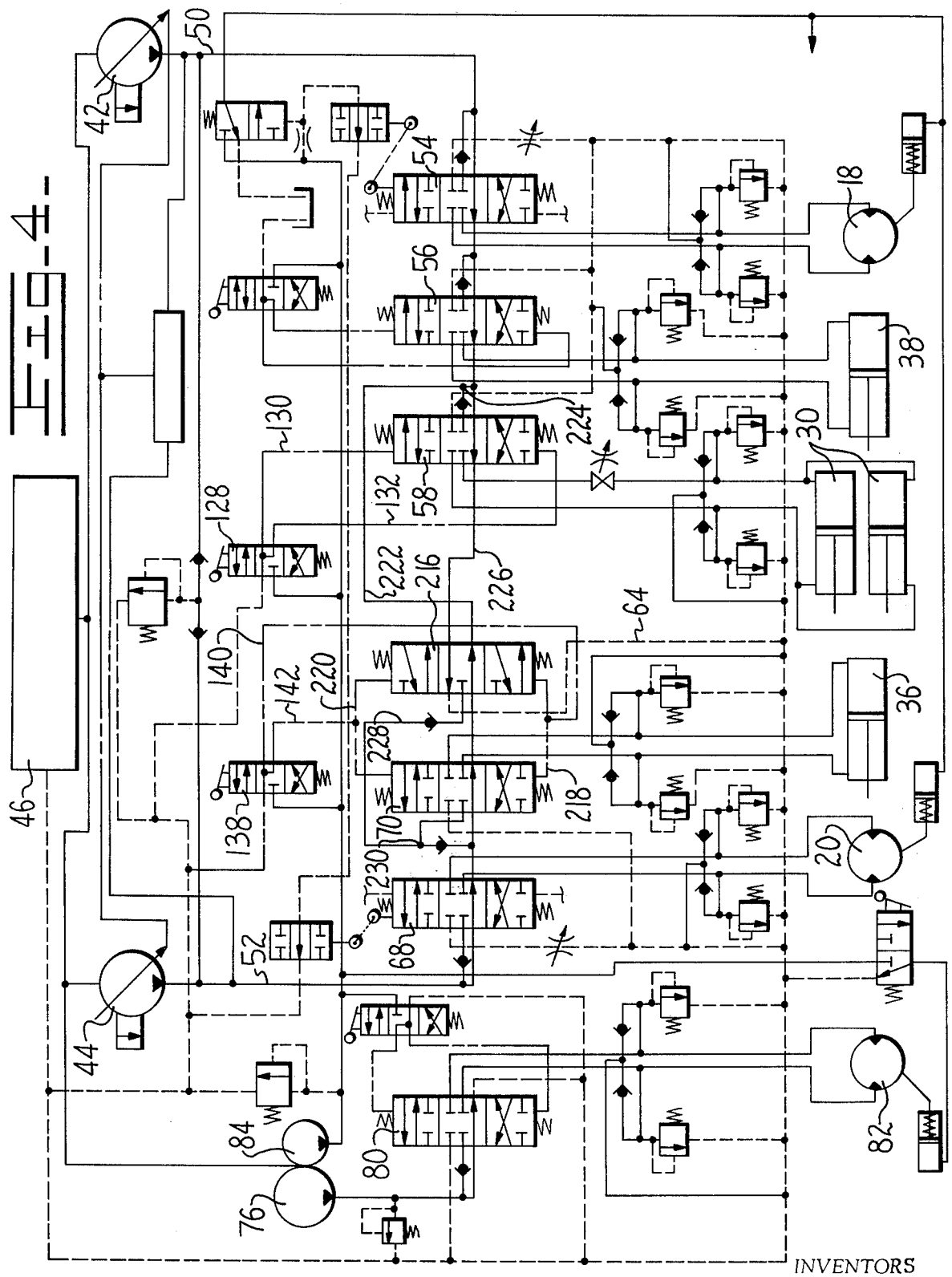

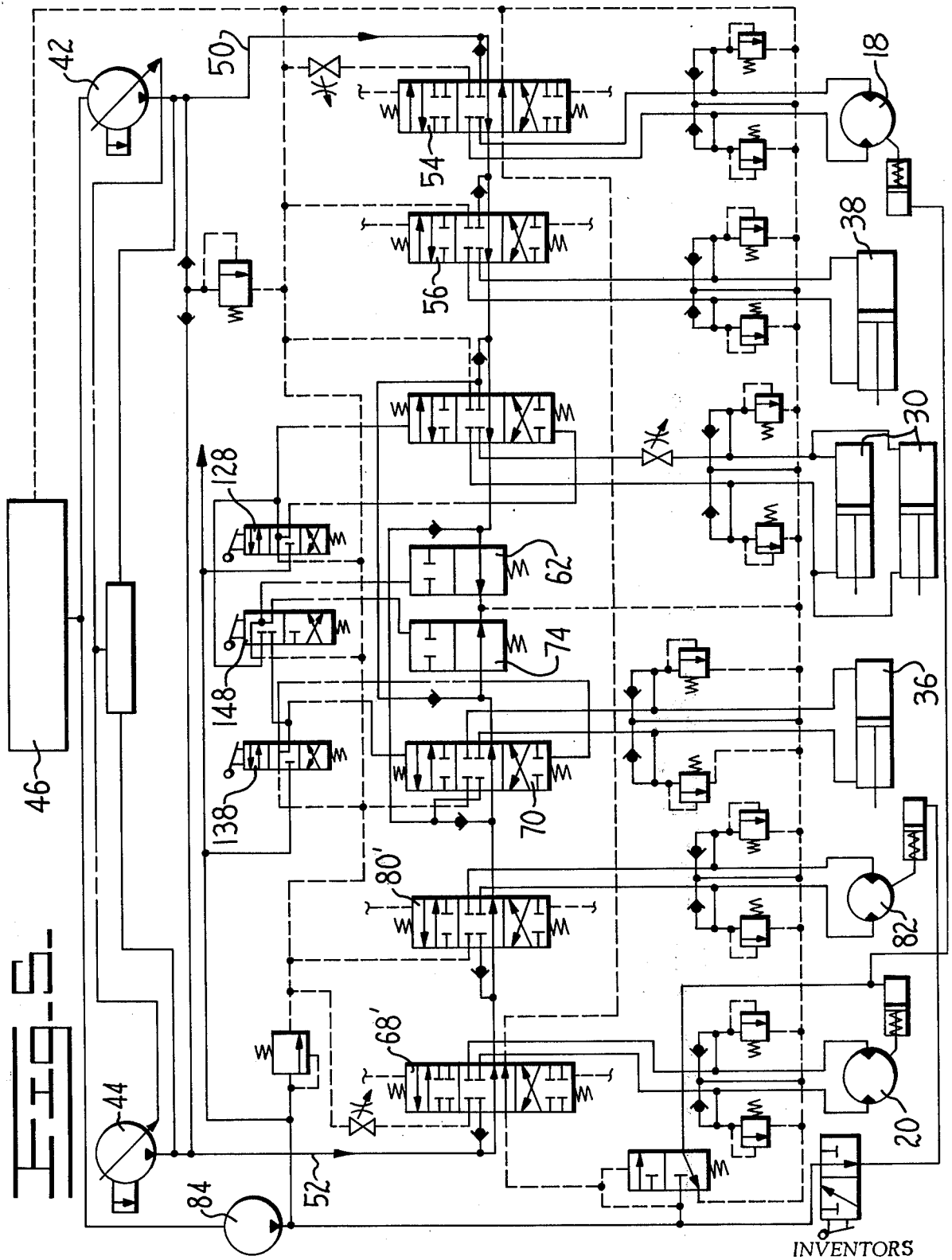

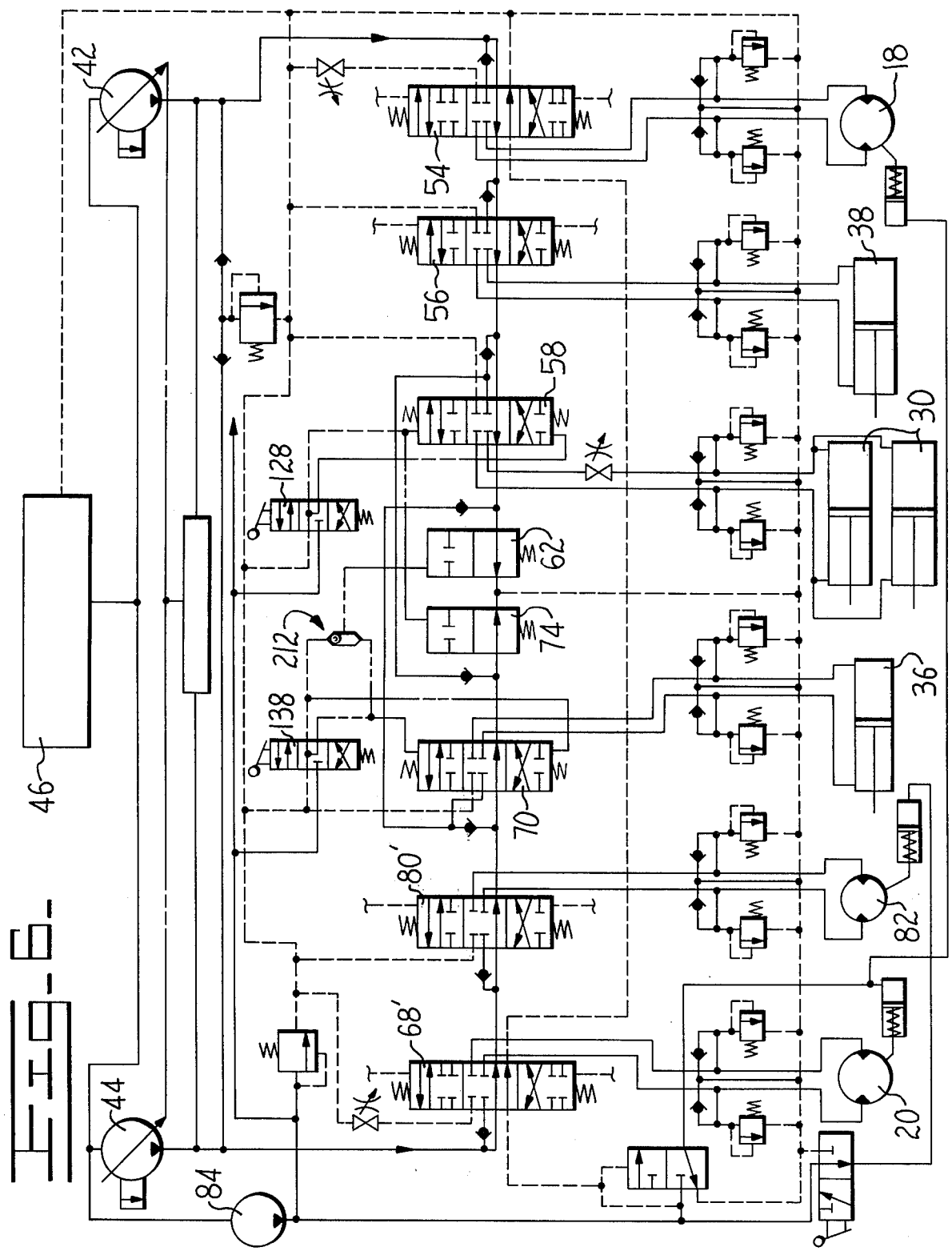

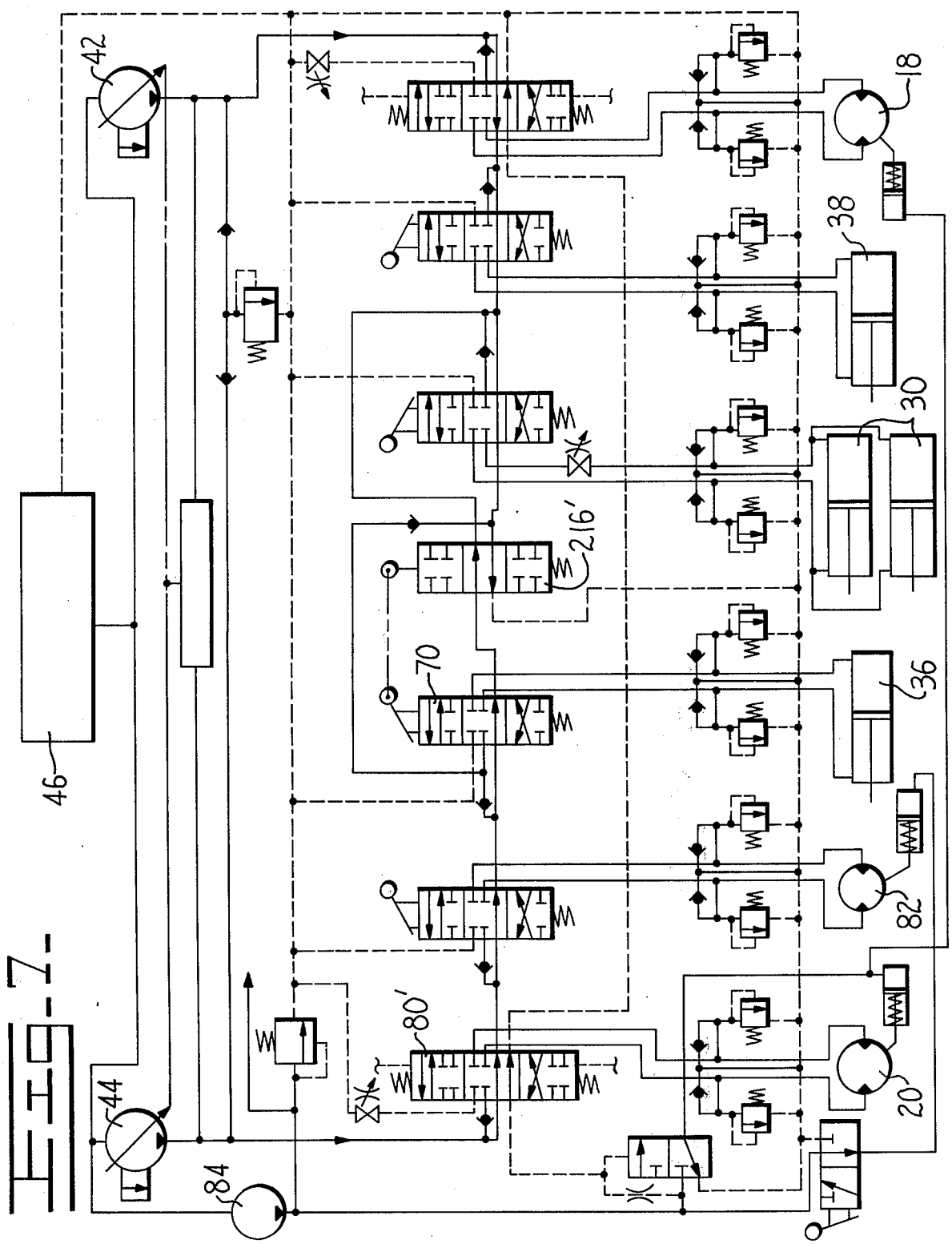

HYDRAULIC CIRCUITRY FOR AN EXCAVATOR

This is a continuation, of Ser. No. 207,027, filed Dec. 13, 1971, now abandoned.

BACKGROUND OF THE INVENTION

The present invention is directed to a hydraulic power and control system and pertains more particularly to a control system for a hydraulic excavator.

Hydraulically operated material handling machines such as backhoes and hydraulic excavators have been known for some time. Such machines are extremely versatile and hence widely used in building and construction industries.

These machines normally utilize an internal combustion engine to drive one or more pumps which supply pressurized fluid to operate separate hydraulic motors for propelling the machine as well as operating the material handling implements. Considerable room exists for improvement in the efficiency and safety of existing prior art machines.

The prior art is exemplified by such U.S. Pat. Nos. as 3,428,647 issued Nov. 18, 1969 to Gerber et al; 3,476,274 issued Nov. 4, 1969 to W. J. Witwer; 3,208,221 issued Sept. 28, 1965 to J. R. Schuetz; 3,172,552 issued Mar. 9, 1965 to R. Metailler; and 2,768,499 issued Oct. 30, 1956 to J. S. Pilch.

The problem of efficiency with such machines is the result of the constant shifting between the implement motors, the need for simultaneous positive operation of a number of motors, and the need for repetitive high speed operation of a single motor. Such requirements impose unusual requirements on the construction of valves and circuits.

In order to obtain positive displacement of a motor, it must have a fluid supply unaffected by the operation of another motor. This, ideally, means a separate pump for each motor. Such an arrangement, however, could be extremely expensive and would result in a substantial waste of pump capacity during times when some of the motors are not being used. This type arrangement having separate pumps is disclosed in U.S. Pat. No. 3,172,552 issued Mar. 9, 1965 to R. Metailler.

In order to make maximum use of pump capacity, it is desirable to combine pump flow to motors which can use the increased capacity, while other motors are idle. In addition to making maximum utilization of the pump capacity, this type arrangement results in faster operation of certain machine functions. Such arrangements not only increase the efficient use of the pump capacities, but also speeds operation of the particular machine function and thereby increases the efficiency of overall material handling operation.

One proposal to increase use of pump flow is to connect the distributor valves in parallel. This arrangement, however, has the disadvantage of lack of positive control when two motors requiring different pressures are simultaneously operated. If, for example, one motor meets increased resistance, it will slow down or stop, while the other motor will speed up. Such a parallel arrangement is disclosed in U.S. Pat. No. 3,208,221 issued Sept. 28, 1965 to J. R. Schuetz.

Other proposals have included series connected distributors with the pumps combined upstream of a series of distributors. This arrangement permits use of combined flow at a particular motor but cuts off flow to downstream motors.

Still another proposal provides separate pumps and distributors with means to divert flow from one pump to combine with the flow from another for operation of one or more motors. Such an arrangement leaves a portion of the hydraulic circuit inoperative, and adds another control lever which the operator must consciously manipulate in order to use the maximum power and speed of the machine.

SUMMARY OF THE INVENTION

It is the primary object of the present invention to overcome the above problems of the prior art.

Another object of the present invention is to provide an improved hydraulic control system for material handling machines and the like.

A further object of the present invention is to provide a hydraulic control system that is arranged for more efficient utilization of available fluid power than has heretofore been known.

Still another object of the present invention is to provide a hydraulic system for powering hydraulic excavators that automatically obtains the maximum efficient movements of the material handling apparatus from the power available.

A still further object of the present invention is to provide a hydraulic power and control system for a hydraulic excavator that provides for maximum efficiency of operation as well as for maximum safety of operation.

In accordance with the present invention, a hydraulic power and control system for an excavator comprises a plurality of pumps supplying fluid independently to separate series of distributor valves. The distributors are arranged to supply fluid from the pumps to selected fluid motors for powering the implements of the apparatus. The distributors and motors are arranged in an order of priority with means for combining pump flow for operation of selected motors.

BRIEF DESCRIPTION OF THE DRAWINGS

The above and other objects and advantages of the present invention will become apparent to those of skill in the art from the following description when read in conjunction with the accompanying drawings wherein:

FIG. 2 is a schematic layout of a preferred embodiment of the present invention;

FIG. 3 is a schematic layout of an alternate embodiment of the present invention;

FIG. 4 is a schematic layout of another embodiment of the present invention;

FIG. 5 is a schematic layout of a further embodiment of the present invention;

FIG. 6 is a schematic layout of still another embodiment of the present invention; and, FIG. 7 is a schematic layout of a still further embodiment of the present invention.

DETAILED DESCRIPTION OF PREFERRED EMBODIMENTS

Figure 1:
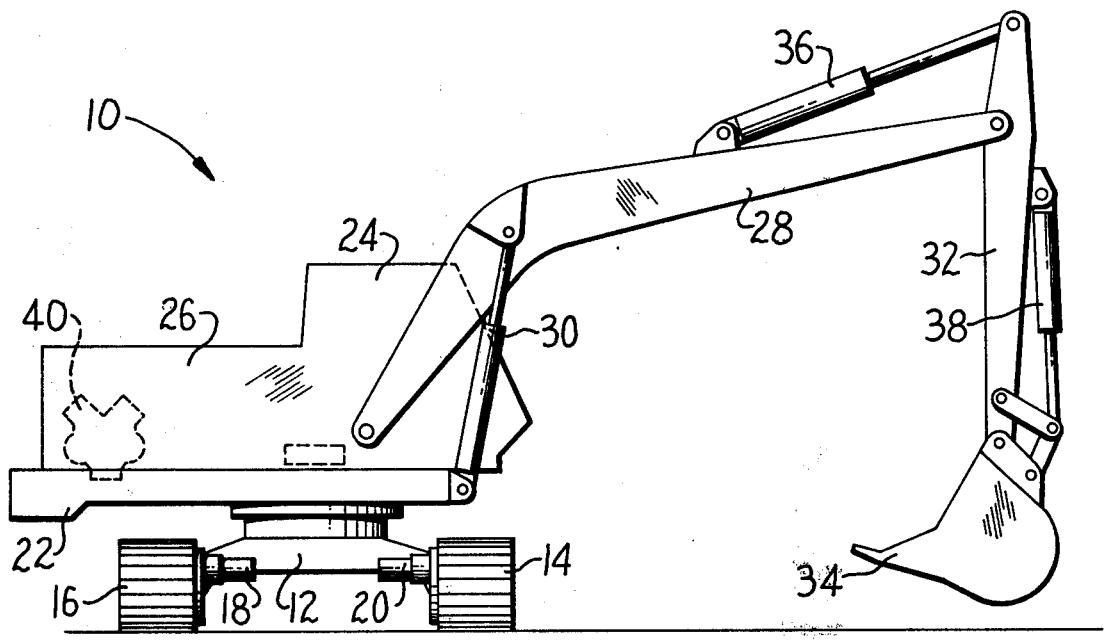
FIG. 1 is an elevational view of a hydraulic excavator incorporating the present invention.

Referring now to the drawings, with particular reference to FIG. 1, there is illustrated a typical hydraulic excavator generally designated by the numeral 10 and comprising a body or undercarriage 12 supported on suitable rotatable wheels or the like such as tracks 14 and 16 driven by suitable hydraulic motors 18 and 20. A suitable rotatable platform 22 is supported for 360° rotation from the body or undercarriage 12 and includes an operator compartment 24 and an engine compartment 26. A boom 28 is pivotally mounted on the rotatable platform 22 and manipulated about its pivotal point by means of a pair of hydraulic motors 30. An arm or jib 32 is pivotally carried by the boom 28 and pivotally carries on the end thereof a bucket 34 with motors 36 and 38 operatively connected for manipulating the arm and bucket respectively. Fluid for manipulating and controlling these motors is supplied by a circuit to be described below and pressurized by means of pumps driven by an engine 40.

Referring now to FIG. 2, there is illustrated a preferred embodiment of the present invention comprising a unique arrangement of distributor valves which provide for an optimum utilization of system power and fluid flow. In accordance with this preferred arrangement, the circuit comprises a pair of large variable displacement pumps 42 and 44 controlled by suitable horsepower limiter means 45 which is responsive to govern the horsepower output of the pumps. The pumps 42 and 44 draw fluid from a tank or reservoir 46 by way of line 48 and supply the fluid under pressure by way of lines 50 and 52 to respective series of distributor valves for controlling the various motors for carrying out the functions of the machine. The first variable displacement pump 42 supplies fluid to the first series of valves comprising a first distributor valve 54 for controlling track motor 18, a second distributor valve 56 for controlling bucket motor 38, and a third distributor valve 58 for controlling the boom motors 32. The fluid, after flowing through these open centered valves without diversion for operation of a motor, passes along conduit 60 through a cross-over valve 62 and to return passage 64. This arrangement of distributors is an interrupted series arrangement.

The second variable displacement pump 44 supplies fluid along conduit 52 to a first distributor valve 68 operative for controlling track motor 20, and then to a second distributor valve 70 for controlling the jib or stick motor 36. After flowing through the above described open centered control valves, the fluid flows along a passageway or conduit 72 and through the open center of a cross-over valve 74 and into return passage 64. Means are provided comprising the cross-over valve 62 and 74 for combining the fluid when not used from either of the above series of valves with the fluid to the last distributor in each of the above series. This combining function will be explained in greater detail later.

The circuit includes a third main supply pump 76 which is a lower volume pump than the previous pumps and may, for example, be a suitable fixed displacement pump and supplies fluid by way of a supply line 78 to distributor 80 for controlling the slewing or platform rotation motor 82. This separate slewing motor and circuit for the platform adds to the versatility as well as safety of the machine. The versatility of the machine is enhanced by the fact that fluid is available for rotating the platform into position at the same time that the vehicle may be in translation along the ground with the track drive motors operating at full speed from fluid supplied by pumps 42 and 44. The safety of the machine is enhanced by the fact that attempts to slew or swing the platform while the vehicle is in full speed translation cannot rob the track motors of fluid necessary to prevent the vehicle being thrown into an uncontrolled turn.

An auxiliary pump 84 supplies fluid by way of a line 86 for operation of pilot valves for controlling or operating the main control valves as well as fluid for operating the slew brake 88 and the track motor brakes 90 and 92. The slew motor brake 88 is controlled by means of valve 94. The track motor brakes are controlled by means of valves 96 and 98 which supply fluid for release of the brakes after automatic spring application thereof. The track drive brakes 90 and 92 are automatically spring-applied and remain applied as long as the track motor control valves 54 and 68 remain in neutral. However, upon movement of either one of these valves from neutral position, the track motor brake valves are automatically actuated to release the respective brakes 90 and 92. The fluid pressure to release the track motor brakes is normally vented to tank by means of vent valves 98 and 100 which are mechanically connected to the track motor control valves 54 and 68 so that movement of either of the valves 54 or 68 will block the vent passage in the valves 98 and 100 and shift the valve 96 so as to apply pressure to the brake cylinders 90 and 92. Upon shifting of control valve 54 and 68 back to neutral, a vent passage is reestablished across the valve 98 or 100 and the brake cylinder 90 or 92 is reapplied by the spring inside the cylinder.

The track drive motors are independently powered, that is, separately powered by the separate variable displacement pumps 42 and 44 for translatory movement of the vehicle. Translatory movement of the vehicle is accomplished by movement of track control valve 54 which directs fluid along either one of lines 102 or 104 to motor 18 and shifting of valve 68 for directing fluid along either line 106 or 108 to track drive motor 20. The direction of drive of the vehicle will depend on which direction the track drive control valves are shifted. As pointed out previously, as soon as the control valves 54 and 68 are shifted in either direction, line 110 is blocked, causing the pressure from line 86 to shift valve 96 and direct pressure through line 112 for activating the motors 90 and 92 to release the brakes on the track drive motors. As soon as the valves 54 and 68 are shifted to neutral the line 112 will again be vented through valve 96 and the track brakes will then again be applied by the spring pressure. A pressure compensating flow control valve is provided in each of the return lines and designated by the numerals 114 and 116, and operate to prevent the motors from overspeeding. Over speed is prevented by restricting the flow back to the tank in each of the track motors. The problem of over speed could occur when the excavator is travelling down a hill and the inertial force of the machine tends to drive the track motors faster than they would normally go.

Each of the motor supply lines is also protected by relief valves and anti-cavitation valves as will be explained later.

After the translation motor control valves have been returned to the neutral position, fluid from the main pumps 42 and 44 flow through the open center of the open-centered distributors 54 and 68 respectively and become immediately available to the next distributor 56 and 70, respectively, downstream in the respective series.

The operation of the bucket 34 by powering motor 38 for pivoting the bucket about its support from the arm 32 is carried out by actuation of pilot valve 118 which is operative to direct pilot fluid along lines 120 and 122 for operation of the control valve 56. Shifting of the control valve 56 from the neutral position will operate to direct fluid along lines 124 or 126 to the motor 38. Shifting of the valve 56 in one direction will cause movement of the motor 38 in one direction and shifting of the valve in the opposite direction causes movement of the motor in the opposite direction. When the valve 56 is returned to neutral position, the fluid supplied thereto from pump 42 then becomes available by flowing through the open center thereof to supply fluid to the boom control valve 58. The valve 58 is actuated by actuation of pilot valve 128 which supplies pilot fluid along pilot lines 130 and 132 for actuating the valve 58 to one or two of the extreme positions directs fluid from the pump 42 along the one or two of the supply lines 134 or 136 for activating or powering the boom lift motors 30. As will be explained later, fluid may also be combined with the fluid from pump 42 from pump 44 for actuating the motors 30.

The stick or jib motor 36 is activated by actuation of valve or pilot valve 138 which directs pilot fluid along lines 140 and 142 to actuate the control valve 70. Actuation of the control valve 70, which is the last distributor valve in the series or bank of valves for controlling the fluid from pump 44, is operative to direct fluid along motor control lines 144 and 146 for powering the motor 36.

Means for combining the flow of fluid from the two variable displacement pumps 42 and 44 is provided by this system such that the flow available from both pumps may be combined at either one of the last distributor valves in each of the two series, that is, distributor valves 58 and 70 for operation of either one of the motors controlled by the respective control valves. This provides means for taking advantage of the full flow available from the pumps to provide increased rapid movement of the selected implements to considerably improve the efficiency and performance of the machine. The means for combining the flow of the two pumps comprises a selector valve 148 which is operative to control pilot lines 150 and 152 which are operative to carry pilot fluid for operation of cross-over valves 62 and 74 respectively. The cross-over valves 62 and 74 are shown or illustrated as being in the open centered positions biased thereto by suitable biasing means such as springs. This position permits fluid passing along conduit 60, for example, to pass through the open center of valve 62 and into the exhaust line 64. Likewise, fluid flowing along conduit 72 passes through the open center of valve 74 into the exhaust conduit or passage 64.

The selector valve 148, in the illustrated position, blocks the flow of pilot fluid from either one of lines 150 or 152 for actuation of the valves 62 or 74. At the same time, in this position, pilot fluid from the upper end of these cross-over valves is vented back to the resevoir 46. When the selector valve 148 is moved to its operative position, pilot line 152 communicates with the pilot control chamber or valve 62 and pilot line 152 communicates with the pilot control valve of valve 74. Thus, when in this position, actuation of pilot valve 128 is operative to direct fluid along pilot line 130 for actuation of valve 58 and along line 150 for actuation of cross-over valve 74. Actuation of the cross-over valve 74 operates to block the flow of fluid from line 72 to the exhaust line 64, causing it to back up through check valve 154 and along conduit or line 156 to join with fluid from conduit 50 at point or junction 158 to be supplied to control valve 58 for operation of the boom control motors 32.

The combining means operates in a similar manner for combining fluid from the two pumps for valve 70 to distribute for operation of the motor 36. More particularly, with the selector valve 148 in operative position, the pilot line 152 is opened to direct fluid by way of line 152a to actuate or move the cross-over valve 62 into the flow-blocking position to cause fluid flowing down conduit 60 to back up through check valve 160 through conduit 162 and combine at point 164 with fluid entering valve 70 from pump 44 by way of conduit 52. Thus, in this manner, the full flow of fluid or full volume of fluid from both pumps 42 and 44 may be made available for operation of the motor 36 for operation of the jib stick. It should be observed, however, that the cross-over valves 62 and 74 are responsive only to movement of the respective pilot valves 128 and 138 in only a single direction in the illustrated embodiment, and thus combining takes place in only a single direction of movement of the particular implement controlled by the particular motor. With this specific arrangement the operator can selectively combine or not at his option, provided the fluid is available from the other series of valves.

For reasons of safety and versatility, a separate swing or slew circuit is available for controlling the rotational movement of the platform. This arrangement is provided so that rotation of the platform may be safely accomplished at the same time that the vehicle is being maneuvered into a position without robbing fluid from one or the other of the track drive motors. This separate circuit comprises the pump 76 supplying fluid to a control valve 80 which is controlled by a pilot valve 168 for directing fluid along motor control lines 170 and 172 for operation of the motor 82. These supply lines 170 and 172 are protected from over pressurization by relief valves 176 and 178 and the motor 82 is protected against cavitation by a pair of anti-cavitation valves 180 and 182.

All the motors and control lines of the system are likewise protected by similar valves. For example, the track drive motors are protected against over-pressurization by means of high pressure relief valves 184 and 186 and against cavitation by means of anti-cavitation valves 188 and 190. The bucket control circuit is protected against over pressurization by means of relief valves 192 and against cavitation by anti-cavitation valves 194. A similar set of relief valves 196 protects the boom circuit against over pressurization while a set of anti-cavitation valves 198 protects the circuit against cavitation.

The boom circuit is further provided with an adjustable restricting valve 200 to precisely control the rate of descent of the boom arm. This arrangement is necessary to prevent the inertia of the heavy weight of the boom arm and bucket from causing the boom to drop with excessive speed.

The jib control circuit is provided with suitable pressure relief valves 202 and anti-cavitation valves 204 for purposes as described above with respect to the previous circuits.

Referring now to FIG. 3 wherein like elements are identified by like numerals, there is illustrated an alternate embodiment of the present invention. This embodiment differs in the means and the effect of the means for providing the combining function. More particularly, the selector valve is eliminated and a shuttle valve introduced into the means for accomplishing the combining function. In this embodiment, pilot fluid from pilot control line 130 is channeled directly by means of a pilot line 206 to cross-over valve 74. Thus, upon actuation of the pilot valve 128 for actuation of the control valve 58 in the direction controlled by pilot line 130, the cross-over or combining spool 74 will be automatically actuated to block the flow to drain of fluid along line 72. This blocking of the flow will cause fluid to back up through check valve 154 through conduit 156 and combine at 158 with fluid from pump 42. Thus, the actual combining is automatic in this instance upon actuation of the pilot valve 128 provided, of course, fluid is available from conduit 72. It should be noted here that no provision is made for combining fluid when the spool 58 is moved in the opposite direction. Thus the combining is available only for lifting the boom for the maximum rate of movement of the boom in the upward direction. No combining is available for movement of the boom in the other direction.

A branch 208 of pilot line 142 and a branch 210 of pilot line 140 communicate by means or by way of a shuttle valve 212 with pilot line 214 for controlling the cross-over or combining valve 62. With this arrangement, operation of the pilot valve 138 for movement of the control valve 70 in either direction will operate to direct fluid past shuttle valve 212 along conduit 214 to actuate the cross-over valve 62. This cross-over valve 62 operates as previously described to cut off the flow of fluid along conduit 60 to prevent its flowing to exhaust 64. This action causes the fluid to back up through check valve 160 and flow along conduit 162 for combining at junction 164 with fluid supplied by pump 44 along supply conduit 52. Thus, fluid from pump 42 can be supplied and combined with fluid from pump 44 for operation of the jib or stick motor 36 in either direction of movement automatically upon actuation of the pilot valve 138. This, of course, assumes that fluid is available at this point from the pump 42.

Referring now to FIG. 4, there is illustrated a further embodiment of the apparatus or means for accomplishing the combining function. In this embodiment a single cross-over or combining spool 216 is hydraulically coupled to shift with control spool 70 in response to pilot fluid from pilot branch lines 218 and 220. The combining spool 216 is provided with a pair of open centers, one of which, while in the neutral position, permits flow from the left hand bank of valves from pump 44 to pass along conduit 222 to join with fluid from pump 42 at junction 224 for supplying to valve 58. The second open center permits fluid flowing along conduit 226 to flow through the open center thereof to return line 64. It is apparent that with this arrangement that when the control valve 70 and the cross-over valve 216 are in neutral position, any fluid available from this bank of valves will flow across and join at junction 224 with fluid flowing through the right bank of valves and thus become available automatically to be directed to the boom control cylinders 32. Thus, the combining function is accomplished automatically, providing the fluid is available from the other bank of valves. The same is true with respect to the control valve 70. In other words, fluid from the right bank of valves is automatically available at distributor valve 70 for actuation of the stick or jib motor 36. In other words, actuation of the valve 70 automatically actuates valve 216 such that fluid from the right bank of valves is directed into conduit 228 where it travels to junction 230 for combining with fluid from pump 44 to be directed by distributor 70 to the motor 36.

The embodiment of FIG. 5 illustrates an alternate embodiment of the overall circuit arrangement, however, using the same flow combining arrangement as the embodiment of FIG. 2. The right hand two thirds of the circuit remain unchanged from the circuit of FIG. 2 and therefore, identical elements will have the same reference numerals. In this circuit, the independent platform slewing circuit is eliminated with the elimination of the independent pump 76 and a rearrangement of the distributor valves for a track drive and slewing such that the track drive comes first in this series with the platform slewing valve coming second in the series fed by the pump 44. The track control spool 68' is transposed ahead of, or upstream of, the platform control spool 80'. This arrangement eliminates the expense of an extra pump. However, at the same time, it partially eliminates the safety feature of the previous embodiment wherein the separate slew circuit insures that operation of the slew circuit will not in any way interfere with the drive circuit.

The FIG. 6 arrangement embodies the two pump supply system arrangement of FIG. 5 together with the combining arrangement of FIG. 3. Therefore identical reference numerals are used to identify the respective parts.

The FIG. 7 embodiment illustrates the two pump system incorporating the single cross-over spool of FIG. 4. However, this embodiment illustrates a purely mechanically actuated valve system wherein the valves are actuated by levers rather than pilot valves as in the previous examples. The cross-over valve likewise is directly coupled to the jib control valve for movement therewith. The circuit arrangement otherwise is precisely the same as in the FIG. 4 embodiment.

From the above description it is apparent that there is provided a novel circuit arrangement having a plurality of pressure sources for supplying a plurality of circuit means for controlling a plurality of motors. The normally independent circuit means of this system are provided with means for combining portions of the circuits for controlling selected motors.

While the present invention has been described with respect to specific embodiments, it is to be understood that numerous changes and modifications may be made in the circuits and arrangements of the elements therein without departing from the spirit and scope of the present invention as defined in the appended claims.

We claim:

1. A hydraulic system for an excavator having a boom, a stick, and a bucket supported on a rotatable platform, said system comprising:
   a first and a second variable displacement pump driven by an internal combustion engine;
   a pair of independent translation motors;
   a slew drive motor for controlling the movement of the platform;
   a boom control motor;
   a stick control motor;
   a bucket control motor;
   a first series of interrupted series connected distributors connecting said first pump first to the first translation motor and lastly to said stick control motor; and,
   a second series of interrupted series connected distributors connecting the second pump first to the second of said translation motors, then to said bucket control motor, and lastly to said boom control motor; and, the last distributor in each of said series being operative to combine fluid from the other series for operation of its respective control motor.

2. The invention of claim 1 comprising a third pump and a distributor valve operative to direct fluid from said third pump to said slew control motor independent of said first track drive motor.

3. The invention of claim 2 wherein the slew control circuit is completely independent of the other circuits of said systems.

4. The invention of claim 1 comprising a cross-over valve operatively connected to the stick distributor for combining fluid from said second pump with fluid from said first pump.

5. The invention of claim 1 wherein the stick control motor is in said first series and said bucket control motor and said boom control motor are in said second series.

6. A hydraulic system for a hydraulic excavator having drive motor means, a platform slew motor, a boom control motor, a jib control motor, and a bucket control motor, the improvement comprising:
a pair of substantially identical variable capacity pumps for supplying fluid to said system;
a first series of series connected distributors operative to selectively direct fluid from one of said pumps to the drive motor means and, the jib control motor; and,
a second series of series connected distributors for directing fluid from the other of said pumps to the drive motor means, then the bucket motor and finally the boom control motor; and,
combining means including a cross-over spool valve operative to make the fluid supplied to one series of said distributors available to the last distributor in said other series when said one series is in substantially the neutral position.

7. The invention of claim 6 wherein said distributors and said cross-over spool are pilot actuated.

8. The invention of claim 7 comprising a selector valve for selectively controlling the pilot operation of the cross-over valve.

9. The invention of claim 7 comprising a shuttle valve for controlling the pilot operation of the cross-over valve.

10. The invention of claim 6 wherein said combining means comprises a pair of cross-over valves, one of said valves being operative to move with the distributor for directing fluid to said boom control motor and the other of said valves being operative to move with the distributor for said jib control motor.

11. The invention of claim 10 comprising a pilot control circuit for controlling said distributor valves; and
means for connecting said pilot control circuit for operation of said cross-over valves.

12. The invention of claim 11 wherein said means for connecting said pilot circuit for operation of said cross-over valves comprises a selector valve.

13. The invention of claim 11 wherein said means for connecting said pilot circuit for operation of said cross-over valves comprises a shuttle valve.

14. A hydraulic system comprising:
first and second pumps, each having a pressure side and an intake side;
conduit means defining first and second circulating paths for the first and second pumps respectively, and including respective ducts connected to the pressure side and intake side of each pump;
a first control valve operatively associated with said first path and a first hydraulically operable load;
a second control valve;
a branch conduit interconnecting said second control valve and said second circulating path;
a first check valve positioned in said branch conduit for allowing flow from the second circulating path to the second control valve, but blocking flow from said second control valve to said second circulating path;
the second control valve connecting the second path with a respective hydraulically operable load through the branch conduit;
a selectively shiftable auxiliary valve in said first path permitting circulation of a hydraulic medium therealong but actuatable to block said circulation, said auxiliary valve having a first position communicating between said duct connected to said pressure side and said duct connected to the intake side of the first pump and permitting return flow of fluid from the first path to the first pump and a second position blocking return flow of fluid;
a shunt conduit connecting said first path, between said auxiliary valve and said first pump at the duct connected to the pressure side of the first pump, with said branch conduit at a point in said branch conduit between the first check valve and the second control valve; and
a second check valve in said shunt conduit automatically opening up upon shifting of said auxiliary valve into said position for unidirectional flow of the medium between said first path and said branch conduit upon blockage of circulation in said first path by said auxiliary valve, whereby a load energized through the second control valve may draw upon medium through the branch conduit from both the first path and the second path.

15. The system defined in claim 14 further comprising common actuating means for said auxiliary valve and said second control valve.

16. The system defined in claim 14 further comprising means interconnecting said auxiliary valve and at least one of said control valves for joint operation.

17. The system defined in claim 14 for an excavator in which said loads include rotary hydraulic motors and piston-and-cylinder arrangements connected with said control valves.

* * * * *